United States Patent [19]

Seidl et al.

[11] Patent Number: 5,132,388
[45] Date of Patent: Jul. 21, 1992

[54] PROCESS OF PREPARING POLYIMIDES FROM DIANHYDRIDE AND DIISOCYANATE IN THE PRESENCE OF WATER, SOLVENT AND ALKALI METAL HYDROXIDE

[75] Inventors: Sigrid Seidl, Seewalchen; Klaus Weinrotter, Vöcklabruck; Reinhold Simharl, Lenzing, all of Austria

[73] Assignee: Lenzing Aktiengesellschaft, Lenzing, Austria

[21] Appl. No.: 546,366

[22] Filed: Jun. 29, 1990

[30] Foreign Application Priority Data

Jul. 10, 1989 [AT] Austria .................................. 1665/89

[51] Int. Cl.$^5$ ............................................. C08G 18/22
[52] U.S. Cl. ............................................. 528/57; 528/73
[58] Field of Search .................................... 528/57, 73

[56] References Cited

U.S. PATENT DOCUMENTS

| | | | |
|---|---|---|---|
| 3,701,756 | 10/1972 | Carleton et al. | 260/78 TF |
| 4,001,186 | 1/1977 | Onder | 260/63 |
| 4,021,412 | 5/1977 | Onder | 260/63 |
| 4,156,065 | 5/1979 | Onder et al. | 528/51 |

FOREIGN PATENT DOCUMENTS 0194058  2/1986  European Pat. Off. .

*Primary Examiner*—Maurice J. Welsh
*Assistant Examiner*—Rachel Johnson
*Attorney, Agent, or Firm*—Kenyon & Kenyon

[57] ABSTRACT

In preparing polyimides by heating a solution of intramolecular tetracarboxylic acid dianhydrides and organic diisocyanates in an aprotic organic solvent in the presence of a polymerization accelerator, a catalytic amount of an alkali metal hydroxide is used as the polymerization accelerator. By this process, polyimides having high molecular weights are produced in a simple manner. The polyimides produced exhibit a high-temperature resistance.

5 Claims, No Drawings

PROCESS OF PREPARING POLYIMIDES FROM DIANHYDRIDE AND DIISOCYANATE IN THE PRESENCE OF WATER, SOLVENT AND ALKALI METAL HYDROXIDE

The invention relates to a process for the preparation of polyimides by heating a solution of intramolecular tetracarboxylic acid dianhydrides and organic diisocyanates in an aprotic organic solvent in the presence of a polymerization accelerator.

It is known that carboxylic acid dianhydrides and diisocyanates condense to polyimides if heated to at least 100° C. for 6 to 24 hours in polar organic solvents. Yet, such reaction conditions affect the selectivity of polycondensation because of the isocyanates reacting also with solvent molecules. In addition, these undesired side reactions prevent high molecular weights from being attained and impair the separation of by-products, the polymer formed thus being contaminated.

Therefore, attempts have been made to increase the reaction speed by polymerization accelerators.

In U.S. Pat. No. 4,021,412, for instance, it is described that alkali metal lactamates catalyze the formation of some mixed polyimides. 4,4'-methylenebis(phenylisocyanate) (MDI) and toluenediisocyanate (TDI) are mentioned as diisocyanate components.

From U.S. Pat. No. 4,156,065 it can be taken that certain four- or five-membered cyclic phosphorus compounds likewisely have a catalytic effect on the formation of MDI/TDI mixed polyimides. However, polymerisates are obtained that contain a considerable amount of carbodiimide units in addition to the imide units. This has negative effects on the thermostability of the polyimides.

According to U.S. Pat. No. 3,701,756, benzophenonetetracarboxylic acid dianhydride (BTDA) and MDI are condensed to a homopolyimide, the extremely toxic phenylmercuric hydroxide and tertiary alcohols, i.a., being mentioned as catalysts. The catalysts partially remain enclosed in the polymers.

From U.S. Pat. No. 4,001,186 it is known that alkali metal alcoholates catalyze the reaction of BTDA with MDI and toluenediisocyanates. A reaction temperature of 80° C. will do for the reaction. Dry dimethylformamide (DMF) is used as the reaction medium. Yet, polymers exhibiting an unsatisfactory thermostability are obtained even there, since the alcoholate ion reacts with the diisocyanates to polyurethanes, which are incorporated in the polyimide chain. Moreover, the diisocyanates must be used at least in a 1 mol percent excess in order to obtain high yields. This excess, on the other hand, involves a reduction of the polymerization degree and, thus, the molecular weight of the polymers.

With all the processes known today for preparing polyimides on a large scale, this minimum excess of diisocyanate must be present in the reaction mixture.

The invention has as its object to eliminate all these disadvantages and has as its particular goal to provide a process of the initially defined kind which may be carried out with a cheap and readily available polymerization accelerator which will not be incorporated in the polymer chain. In addition, the process according to the invention is to allow for the preparation of polyimides having higher molecular weights and, thus, improved thermostability values.

In accordance with the invention, this object is achieved in that a catalytic amount of an alkali metal hydroxide is used as the polymerization accelerator.

The following intramolecular tetracarboxylic acid dianhydrides are particularly suitable: pyromellitic acid dianhydride, benzene-1,2,3,4-tetracarboxylic acid dianhydride, diphenyltetracarboxylic acid dianhydride, naphthalenetetracarboxylic acid dianhydride, benzophenone-3,3', 4,4'-tetracarboxylic acid dianhydride, 4,4'-oxydiphthalic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenanthrene-1,3,9,10-tetracarboxylic acid dianhydride, perylene-3,4,9,10-tetracarboxylic acid dianhydride, bis(2,3-dicarboxyphenyl)methane dianhydride, bis(3,4-dicarboxyphenyl)methane dianhydride, 1,1-bis(2,3-dicarboxyphenyl)ethane dianhydride, 1,1-bis(3,4-dicarboxyphenyl)ethane dianhydride, 2,2-bis(2,3-dicarboxyphenyl)propane dianhydride, 2,3-bis(3,4-dicarboxyphenyl)-propane dianhydride, bis(3,4-dicarboxyphenyl)sulfone dianhydride, bis(3,4-dicarboxyphenyl)ether dianhydride, ethylene tetracarboxylic acid dianhydride, butane-1,2,3,4-tetracarboxylic acid dianhydride, cyclopentane-1,2,3,4-tetracarboxylic acid dianhydride, pyrrolidine-2,3,4,5-tetracarboxylic acid dianhydride, pyrazine-2,3,5,6-tetracarboxylic acid dianhydride and thiophen-2,3,4,5-tetracarboxylic acid dianhydride.

2,4-toluenediisocyanate, 2,6-toluenediisocyanate, 4,4'-methylene-bis(phenylisocyanate), dianisidinediisocyanate, tolidinediisocyanate, hexamethylenediisocyanate, 4,4'-methylenebis(cyclohexylisocyanate), m-xylenediisocyanate, 1,5-naphthalenediisocyanate, 1,4-diethylbenzene-$\beta\beta'$-diisocyanate are particularly suitable organic diisocyanates.

According to the process of the invention, mixtures of several dianhydrides with mixtures of several diisocyanates may also be reacted to polyimides.

Aprotic solvents primarily comprise dipolar solvents, such as DMF, dimethylacetamide, dimethylsulfoxide, N-methyl-2-pyrrolidone and tetrahydrofuran. Yet, the process of the invention also may be performed in benzene, toluene or xylene.

The inherent viscosity of the finished polycondensation solution implies that the use according to the invention, of an alkali metal hydroxide as the polymerization accelerator yields polyimides having higher molecular weights than are attained when using alkali metal alcoholates.

The alkali metal hydroxide may be added to the reaction mixture either in the solid form or, suitably, in the form of an aqueous solution.

According to a preferred embodiment of the process according to the invention, the preparation of polyimides having structural units of the general formula

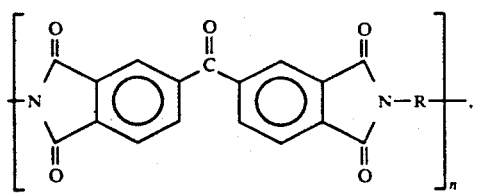

wherein R represents the group

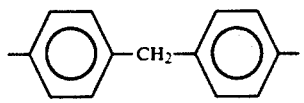

and/or the group(s)

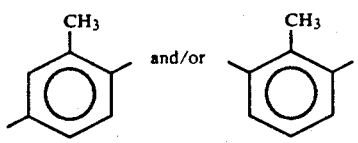

and n is an integer larger than 1, is effected in that a solution of benzophenonetetracarboxylic acid dianhydride and 4,4'-methylenebis(phenylisocyanate) and/or 2,4- and/or 2,6-toluenediisocyanate in a dipolar aprotic solvent is heated, sodium hydroxide being used as the alkali metal hydroxide.

DMF and N-methyl-2-pyrrolidone are particularly suited as solvents.

The process according to the invention may be carried out under especially mild conditions at a temperature of 100° C. at most, preferably of between 60° C. and 80° C., between 0.0001 and 0.2 mol alkali hydroxide, preferably between 0.01 mol and 0.05 mol alkali hydroxide, being used per mol of diisocyanate and between 0.97 mol and 1.01 mol diisocyanate being used per mol of tetracarboxylic acid dianhydride.

The progression of the process according to the invention may be followed by conventional analytical procedures, for instance, by IR-spectrum analysis (absence of absorption corresponding to free NCO groups). Since $CO_2$ is separated during the reaction, the extinction of the $CO_2$ development indicates the end of the polycondensation. The reaction product can be isolated by evaporation of the solvent or precipitation, or the solution may be further processed as such. The polyimides obtained may be used to produce high-temperature resistant fibers, shaped articles and coatings.

It has proved that alkali metal hydroxides not only catalyze the formation of polyimides, but also of mono- and diimides from the respective starting compounds. Such imides are known. According to U.S. Pat. No. 3,701,756, for instance, N-phenylphthalimide can be prepared by reacting phthalic acid anhydride and phenyl isocyanate in the presence of phenylmercuric hydroxide. The reaction is performed in benzene at an elevated temperature.

Therefore, the invention also relates to a process for the preparation of mono- or diimides by reacting intramolecular dicarboxylic acid anhydrides with organic mono- or diisocyanates or by reacting intramolecular tetracarboxylic acid dianhydrides with organic monoisocyanates in a dipolar aprotic solvent in the presence of a polymerization accelerator, which is characterized in that a catalytic amount of an alkali metal hydroxide is used as the polymerization accelerator, the alkali metal hydroxide suitably being present as an aqueous solution.

Particularly suited intramolecular dicarboxylic acid anhydrides are phthalic acid anhydride, succinic acid anhydride, adipic acid anhydride, glutaric acid anhydride, citraconic acid anhydride, maleic acid anhydride, itaconic acid anhydride, naphthalene-1,2-dicarboxylic acid anhydride, naphthalene-1,8-dicarboxylic acid anhydride, chlorendic acid anhydride and 1,2,3,6-tetrahydrophthalic acid anhydride.

Among the diisocyanates and tetracarboxylic acid anhydrides those pointed out above may be used, and among the monoisocyanates phenylisocyanate, p-tolueneisocyanate, o-tolueneisocyanate, m-xylylisocyanate, α-naphthylisocyanate, octadecylisocyanate, benzylisocyanate, allyl-isocyanate, cyclohexylisocyanate and p-nitrophenylisocyanate are preferred.

The process according to the invention, for the preparation of mono- and diimides is characterized by the additional characteristic features:

that it is performed at a temperature of 100° C. at the most, preferably of between 60° C. and 80° C., that per mol of mono- or diisocyanate between 0.0001 and 0.2 mol of alkali hydroxide, preferably between 0.01 and 0.005 mol of alkali metal hydroxide, is used, that per mol of dicarboxylic acid anhydride or tetracarboxylic acid dianhydride between 0.97 mol and 1.01 mol of mono or diisocyanate is used.

Monoimides are used as fungicides, insecticides and herbicides.

The invention will be explained in more detail by way of the following examples.

EXAMPLE 1

A mixture of 5.92 g (0.04 mol) phthalic acid anhydride, 4.76 g (0.04 mol) phenyl isocyanate and 0.02 mg (0.005 mol) NaOH, dissolved in a drop of water, was stirred in 40 ml dry dimethylformamide for 3.5 hours at 100° C. After heating had been completed, the reaction mixture was cooled to room temperature, whereupon the solid precipitate was filtered, washed with hexane and dried. Yield: 7.54 g n-phenylphthalimide (=85.1%) in the form of white crystals.

For reasons of comparison, the reaction was carried out without catalyst, 4.99 g n-phenylphthalimide having been obtained at a yield of as low as 56.1%.

With dimethylphospholene oxide as a catalyst, N-phenylphthalimide was obtained at a yield of 59.1%.

EXAMPLE 2

A mixture of 8.72 g (0.04 mol) pyromellitic acid dianyhdride, 6.97 g (0.04 mol) 2,4-toluenediisocyanate and 0.02 mg (0.0005 mol) NaOH, dissolved in a drop of water, was stirred in 40 ml dry dimethylformamide for 3.5 hours at 100° C. After heating had been completed, the yellow precipitate formed was filtered, washed and dried. Yield of polytoluenepyromellitic acid imide: 99.2%. By comparison, the yield of the reaction performed without catalyst was only 90.1%.

EXAMPLE 3

In a 1000 ml flask fitted with a stirrer, a reflux cooler, a thermometer and a nitrogen cooling, 161 g (0.5 mol) benzophenone-3,3', 4,4'-tetracarboxylic acid dianhydride and 0.15 g (0,0037 mol) NaOH, dissolved in 0.4 ml water, were dissolved in 496 g dry DMF. The reaction mixture was heated to 80° C., and 94.7 g (0.5 mol) of an isocyanate mixture consisting of 69.7 g (0.4 mol) 2,4-toluenediisocyanate and 25 g (0.1 mol) 4,4'-methylenebis(phenylisocyanate) were dropwisely added under constant stirring and under nitrogen atmosphere within six hours. After this, the polycondensation solution was stirred for another hour at 80° C. until completion of the $CO_2$ development. Consequently, no free anhydride groups were visible in the IR spectrum, thus, no further addition of diisocyanate was necessary.

The finished polycondensation solution had an inherent viscosity (c=0.5 g/dl at 25° C. in DMF/1% LiBr) of 66 ml/g. By the addition of acetone, the polyimide was precipitated, the precipitate was filtered, washed and dried. The glass transition temperature of the powder obtained was 315° C.

COMPARISON TO EXAMPLE 3

According to the process described in Example 3 and by using identical charging amounts, with the exception of adding 0.2 g (0.0037 mol) sodium methylate in solid form instead of NaOH, the same reaction was carried out. After seven hours of reaction time, free anhydride groups were still detectable in the IR spectrum. Therefore, an additional 0.95 g isocyanate mixture consisting of 0.25 g (0.001 mol) MDI and 0.70 g (0.004 mol) TDI was dropwisely added within two hours. This corresponds to an isocyanate excess of 1% by mol.

The finished polycondensation solution had an inherent viscosity (c=0.5 g/dl at 25° C. in DMF/1% LiBr) of as low as 64 ml/g. The powder precipitated analogously to Example 3 had a glass transition temperature of 315° C.

EXAMPLE 4

In a stainless steel reactor fitted with a stirrer, a reflux cooler, a thermoprobe and nitrogen flushing, 5928 g (18.4 mol) benzophenone-3,3',4,4'-tetracarboxylic acid dianhydride and 7.4 g (0,184 mol) NaOH, dissolved in 15 ml water, were dissolved in 23350 g dry DMF. The reaction mixture was heated to 80° C., and 3485 g (18.4 mol) of an isocyanate mixture consisting of 2564 g (14.72 mol) 2,4-toluenediisocyanate and 921 g (3.68 mol) 4,4'-methylenebis(phenylisocyanate) were dropwisely added under constant stirring and unter nitrogen atmosphere within six hours. The increase in the viscosity was followed by an in-line viscometer. The viscosity of the polycondensation solution started to increase already at a 98% addition of the total amount of isocyanate. After the addition of the total amount of isocyanate stirring was continued at 80° C. for another hour until completion of the $CO_2$ development. After this, no free anhydride and isocyanate groups were visible in the IR spectrum any longer.

The finished polycondensation solution had an inherent viscosity (c=0.5 g/dl at 25° C. in DMF/1% LiBr) of 57 to 66 ml/g. The overall reaction time was seven hours.

COMPARISON TO EXAMPLE 4

According to the process described in Example 4 and by using identical charging amounts, with the exception of adding 9.9 g (0.184 mol) sodium methylate in solid form instead of soda lye, the same reaction was carried out. After the addition of the total amount of isocyanate, no increase in the viscosity was observed on the in-line viscometer. After seven hours of reaction time, free anhydride groups were still detectable in the IR spectrum. Therefore, additional 52.3 g (0.276 mol) isocyanate mixture were dropwisely added within two hours. This corresponds to an isocyanate excess of 1.5% by mol. It was only then that the viscosity of the polycondensation solution began to rise. Stirring was continued for another hour at 80° C. until completion of the $CO_2$ development and of the increase in viscosity. Finally, no free anhydride or isocyanate groups were detected any longer in the IR spectrum.

The finished polycondensation solution had an inherent viscosity (c=0.5 g/dl at 25° C. in DMF/1% LiBr) of as low as 46 to 55 ml/g. The overall reaction time was nine hours.

What we claim is:

1. A process for preparing polyimides comprising heating a solution of intramolecular tetracarboxylic acid dianhydrides and organic diisocyanates in an aprotic organic solvent in the presence of water and a catalytic amount of an alkali metal hydroxide.

2. A process as set forth in claim 1 to be used for the preparation of polyimides having structural units of the general formula

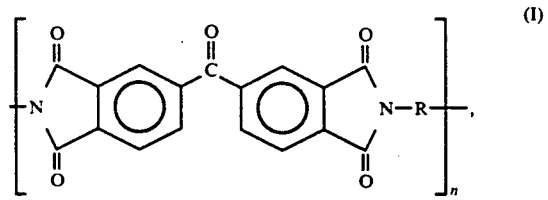

wherein R is selected from at least one of the groups consisting of

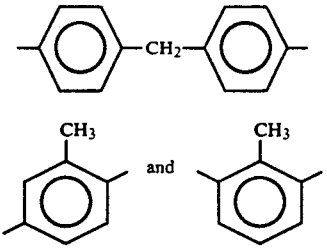

and n is an integer larger than 1, by preparing a solution of benzophenonetetracarboxylic acid dianhydride and at least one of 4,4'-methylenebis(phenylisocyanate), 2,4- and 2,6-toluenediisocyanate in a dipolar aprotic solvent and heating said solution, wherein said alkali metal hydroxide is comprised of sodium hydroxide.

3. A process as set forth in claim 1, wherein
a maximum temperature of 100° C. is adjusted,
between 0.0001 and 0.2 mol of alkali metal hydroxide is used per mol of diisocyanate, and
between 0.97 mol and 1.01 mol of diisocyanate is used per mol of tetracarboxylic acid dianhydride.

4. A process as set forth in claim 3, wherein a temperature is held between 60° C. and 80° C.

5. A process as set forth in claim 3, wherein between 0.01 and 0.005 mol of alkali metal hydroxide is used.

* * * * *